(12) United States Patent
Rahul et al.

(10) Patent No.: US 11,990,131 B2
(45) Date of Patent: May 21, 2024

(54) METHOD FOR PROCESSING A VIDEO FILE COMPRISING AUDIO CONTENT AND VISUAL CONTENT COMPRISING TEXT CONTENT

(71) Applicant: ATOS GLOBAL IT SOLUTIONS AND SERVICES PRIVATE LIMITED, Maharashtra (IN)

(72) Inventors: Jain Rahul, Thergaon Pune (IN); Sen Rudreshwar, Bangalore (IN); Goyal Anuj, Pune (IN); Chavan Dhananjay, Pune (IN); Sinha Utsav, Kolkata (IN); Shekhar Bavanari, Telangana (IN)

(73) Assignee: BULL SAS, Les Clayes sous Bois (FR)

( * ) Notice: Subject to any disclaimer, the term of this patent is extended or adjusted under 35 U.S.C. 154(b) by 371 days.

(21) Appl. No.: 17/376,352

(22) Filed: Jul. 15, 2021

(65) Prior Publication Data

US 2022/0028391 A1    Jan. 27, 2022

(30) Foreign Application Priority Data

Jul. 24, 2020 (EP) .................... 20187791

(51) Int. Cl.
*G10L 15/26* (2006.01)
(52) U.S. Cl.
CPC .................... *G10L 15/26* (2013.01)
(58) Field of Classification Search
CPC ....... G10L 15/26; G06V 20/50; G06V 20/635
See application file for complete search history.

(56) References Cited

U.S. PATENT DOCUMENTS

| | | | |
|---|---|---|---|
| 10,304,458 B1 | 5/2019 | Woo | |
| 10,366,169 B2* | 7/2019 | Smith | H04N 21/4355 |
| 11,176,332 B2* | 11/2021 | Ishikawa | G06F 16/483 |
| 2006/0074895 A1* | 4/2006 | Belknap | G06F 16/60 |
| 2015/0243276 A1 | 8/2015 | Cooper | |
| 2016/0155001 A1* | 6/2016 | Betley | H04N 21/8549 |
| | | | 725/116 |
| 2017/0083770 A1* | 3/2017 | Carlson | G06V 20/698 |
| 2019/0215578 A1 | 7/2019 | Beckett | |
| 2021/0165973 A1* | 6/2021 | Kofman | G06F 40/30 |

FOREIGN PATENT DOCUMENTS

CA      2202539 A1      4/1996

OTHER PUBLICATIONS

European Search Report for corresponding EP Application No. 20187791, dated Dec. 12, 2020.

* cited by examiner

*Primary Examiner* — Abul K Azad
(74) *Attorney, Agent, or Firm* — MEAGHER EMANUEL LAKS GOLDBERG & LIAO, LLP (57) ABSTRACT

This invention relates to a computer implemented method (10) for processing a video file, said video file comprising audio content and visual content, the visual content comprising text content, wherein the method comprises:
- (S11) extracting the text content in the visual content;
- (S12) generating a context information for the audio content based on the text content extracted from said visual content; and
- (S13) converting the audio content into text by using the context information generated based on the text content extracted from the visual content of the video file.

13 Claims, 4 Drawing Sheets

METHOD FOR PROCESSING A VIDEO FILE COMPRISING AUDIO CONTENT AND VISUAL CONTENT COMPRISING TEXT CONTENT

CROSS-REFERENCE TO RELATED APPLICATIONS

The present application claims priority to European application EP 20187791.7, filed Jul. 24, 2020, which is incorporated by reference herein in its entirety.

FIELD OF THE INVENTION

The present disclosure relates to the processing of video files, and more specifically to a method and device for processing a video file comprising audio content and visual content, wherein said visual content comprises text content. In particular, the processing of the video file aims at automatically transcribing the audio content of the video file.

BACKGROUND OF THE INVENTION

Nowadays, there are many different existing solutions for automatically transcribing audio files, i.e. for performing a speech to text conversion of the audio file. Such existing solutions, sometimes referred to as "transcription engines", include e.g. Google Speech to text, Azure Speech to text API, etc.

These existing transcription engines usually provide a satisfactory performance when the audio files correspond to general public conversations.

However, existing transcription engines exhibit a poor performance when the audio file corresponds to conversations or presentations using uncommon words and/or expressions. For instance, existing transcription engines will exhibit a poor performance when applied to an audio file corresponding to a project-specific conversation held within an enterprise, since such a conversation will use many words, expressions, acronyms, etc., that may be specific to the enterprise's environment, and might therefore not be correctly transcribed by the transcription engine.

In order to improve the performance of existing transcription engines, it is possible to manually input to the transcription engine some information on the context of the audio file to be processed. By using this context information, which may include specific words, expressions, acronyms, etc., expected to be used in the recorded speech, the accuracy of the transcription made by the transcription engine can be improved.

However, it is understood that inputting such context information to the transcription engine might prove cumbersome if the number of audio files to be processed is important.

Within an enterprise, there are more and more types of knowledge files that should be digitally searchable in order to be able to retrieve easily knowledge files related to a specific topic. One of the types of knowledge files that it is becoming more and more important in volume is video files corresponding to video recordings of work sessions or presentations. However, such video files are not digitally searchable as such.

A solution would be to automatically transcribe the audio content of the video file, in order to obtain text that is digitally searchable and that can be used to identify a specific video file discussing of a specific topic.

However, as discussed above, existing transcription engines exhibit poor performance when the context of the conversation is too specific, which is the case for e.g. video files recorded in an enterprise environment. While this performance can be improved by manually inputting some context information to the transcription engine, such manual input of context information is not an option as it would be highly time-consuming as the number of video files to be processed is becoming increasingly important.

SUMMARY OF THE INVENTION

The present disclosure aims at proposing a solution which overcomes all or part of the limitations discussed above.

In particular, the present disclosure aims at proposing a solution that enables improved automatic transcription of video files comprising both an audio content and a visual content, for video files having text content embedded in their visual content.

For this purpose, and according to a first aspect, the present disclosure relates to a computer implemented method for processing a video file, said video file comprising audio content and visual content, the visual content comprising text content, wherein the method comprises:
- extracting the text content in the visual content;
  - generating a context information for the audio content based on the text content extracted from said visual content;
  - converting the audio content into text by using the context information generated based on the text content extracted from the visual content of the video file.

For a video file such as a recording of an oral presentation by a speaker using slides for its presentation, or a recording of a videotelephony session during which slides are presented, or a recording of a webinar, etc., the visual content will have text content embedded therein, and this text content will be strongly correlated with the audio content of the video file. Indeed, when slides are presented, the text content present in the slides is usually repeated and/or explained by the speaker, such that the content of the slides of the presentation, and in particular the text content present in the slides, provides information on the context of the spoken presentation (audio content of the video file) made by the speaker.

Hence, when e.g. slides are captured in the visual content of the video file to be processed, the text content embedded in the visual content of the video file can be used as context information for the transcription of the audio content of said video file. This holds not only for slides, but also for any text content that may be present in the visual content of a video file and that is correlated with the audio content.

Accordingly, it is proposed to automatically extract the text content from the visual content of the video file, by using digital image processing techniques such as OCR ("Optical Character Recognition") techniques, and to use it to generate context information for the transcription of the audio content of the video file. Indeed, the performance of such OCR techniques is generally good, and the text content automatically extracted from the visual content will generally be accurate, enabling the automatic generation of relevant context information. Thanks to this context information, that is generated automatically through e.g. OCR techniques, the performance of the automatic transcription of the audio content of the video file is significantly improved, without requiring user intervention.

In specific embodiments, the processing method can further comprise one or more of the following features, considered either alone or in any technically possible combination.

In a specific embodiment, the processing method further comprises:
- generating an additional context information for the audio content based on the text obtained by converting the audio content;
- combining the context information generated based on the text content extracted from the visual content with the additional context information so as to obtain a combined context information;
- re-converting the audio content into text by using the combined context information.

Hence, a proposed solution for further improving the accuracy of the transcription of the audio content of the video file is to iterate the processing in order to try and further improve the relevance of the context information used and, consequently, the accuracy of the transcribed text. For that purpose, it is proposed to generate an additional context information based on the text extracted during a first transcription of the audio content of the video file. This additional content information is combined with the initial context information (obtained from the visual content of the video file) in order to obtain a combined context information expected to be even more relevant than the initial context information. This combined context information is then used during a second transcription of the audio content of the file, thereby improving the accuracy of the transcribed text.

In a specific embodiment, when the visual content comprises successive frames, the processing method comprises selecting key frames among the frames of the visual content, and the text content in the visual content is extracted by processing only the key frames.

For example, when slides are presented during an oral presentation or a webinar, etc., then the speaker usually discusses each slide during a certain amount of time. In that case, the visual content of the video file, when it represents the slides presented, remains still most of the time, and will change only when the speaker switches from one slide to another. In other words, when the visual content comprises successive frames (e.g. 25 frames per second or more), many frames might be identical or almost identical. Hence, processing each frame for extracting the text content therein would be equivalent to processing multiple times the same frame, which would be inefficient from a computational complexity standpoint. Hence, instead of processing each frame for extracting the text content therein, it is proposed to select key frames beforehand, in order to reduce the number of frames to be processed. Typically, a key frame corresponds to a frame that is repeated several times in the frames of the visual content and selecting a key frame can resume to keeping only one among identical frames and discarding the other identical frames. For instance, identical frames, or almost identical frames, can be detected by comparing successive frames by e.g. using image correlation techniques or any known method for evaluating image resemblance.

In a specific embodiment, the processing method comprises obtaining respective times of the key frames and slicing the audio content into several audio chunks based on the times of the key frames. For instance, it is then possible to generate a specific context information from each key frame, and to use each specific context information only for the transcription of the audio chunk associated to the corresponding key frame.

In a specific embodiment, the processing method comprises generating a text file for the video file by grouping, for all key frames, the text content extracted from a key frame with the text obtained by converting the audio chunk corresponding to the same key frame.

In a specific embodiment, generating a context information based on the text content extracted from the visual content comprises extracting, from the text content extracted from the visual content, acronyms and/or groups of words.

In a specific embodiment, the processing method comprises post-processing the text obtained by converting the audio content in order to perform one among:
- adding punctuation;
- removing filler spoken expressions;
- breaking sentences into several sentences;
- grouping sentences in respective paragraphs;
- recommending sentences for review.

According to a second aspect, the present disclosure relates to a computer program product comprising instructions on a non-transitory computer readable medium which, when executed by a processor, configure said processor to carry out a method for processing a video file according to any one of the embodiments of the invention.

According to a third aspect, the present disclosure relates to a computer-readable storage medium comprising instructions which, when executed by a processor, configure said processor to carry out a method for processing a video file according to any one of the embodiments of the invention.

According to a fourth aspect, the present disclosure relates to a device for processing a video file, said video file comprising audio content and visual content, the visual content comprising text content, wherein the device comprises a processing circuit configured to:
- extract the text content in the visual content;
- generate a context information for the audio content based on the text content extracted from said visual content;
- convert the audio content into text by using the context information generated based on the text content extracted from the visual content of the video file.

In specific embodiments, the processing device can further comprise one or more of the following features, considered either alone or in any technically possible combination.

In a specific embodiment, the processing circuit is further configured to: generate an additional context information for the audio content based on the text obtained by converting the audio content;
- combine the context information generated based on the text content extracted from the visual content with the additional context information so as to obtain a combined context information;
- re-convert the audio content into text by using the combined context information.

In a specific embodiment, the visual content comprises successive frames, and the processing circuit is configured to select key frames among the frames of the visual content, and to process only the key frames to extract the text content in the visual content.

In a specific embodiment, the processing circuit is further configured to obtain respective times of the key frames and to slice the audio content into several audio chunks based on the times of the key frames.

In a specific embodiment, the processing circuit is further configured to generate a text file for the video file by grouping, for all key frames, the text content extracted from a key frame with the text obtained by converting the audio chunk corresponding to the same key frame.

In a specific embodiment, the processing circuit is configured to generate the context information based on the text content extracted from the visual content by extracting, from the text content extracted from the visual content, acronyms and/or groups of words.

In a specific embodiment, the processing circuit is further configured to post-process the text obtained by converting the audio content in order to perform one among:
adding punctuation;
removing filler spoken expressions;
breaking sentences into several sentences;
grouping sentences in respective paragraphs;
recommending sentences for review.

BRIEF DESCRIPTION OF THE DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

DETAILED DESCRIPTION OF THE INVENTION

As discussed above, the present disclosure relates to a computer-implemented method 10 for processing a video file. The processing method 10 is carried out by a processing device (not represented in the figures) comprising a processing circuit.

For example, the processing circuit comprises one or more processors, which may distributed on one or more computers, and storage means (i.e., non-transitory computer storage media, including, e.g., magnetic hard disk, solid-state disk, optical disk, electronic memory, etc.) in which a computer program product is stored, in the form of a set of program-code instructions to be executed in order to implement all or a part of the steps of the processing method 10. Alternatively, or in combination thereof, the processing circuit can comprise one or more programmable logic circuits (FPGA, PLD, etc.), and/or one or more specialized integrated circuits (ASIC), etc., adapted for implementing all or part of said steps of the processing method 10.

Hence, the processing circuit form a set of means configured by software (specific computer program product) and/or by hardware (processor, FPGA, PLD, ASIC, etc.) to implement the steps of the processing method 10.

Figure 1:
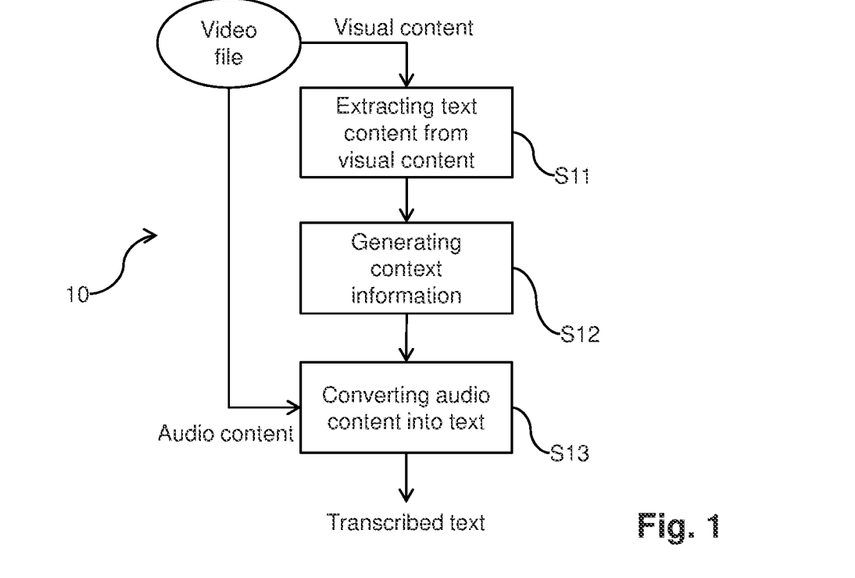
FIG. 1: a diagram representing the main steps of an exemplary embodiment of method for processing a video file.

FIG. 1 represents schematically the main steps of the processing method 10, which is applied to a video file comprising audio content and visual content, the visual content further comprising text content embedded therein. As discussed above, the video file may correspond to e.g. a video recording of an oral presentation, of a videotelephony session, of a webinar, etc. As illustrated by FIG. 1, the processing method 10 comprises the following steps:

a step S11 of extracting the text content visible in the visual content of the video file;

a step S12 of generating a context information for the audio content based on the text content extracted from said visual content;

a step S13 of converting the audio content into text by using the context information generated based on the text content extracted from the visual content of the video file.

During step S11, the processing device extracts the text content embedded in the visual content of the video file by using digital image processing techniques e.g. by using any existing OCR technique or tool (e.g. Google OCR, etc.). Preferably, it is also possible to use artificial intelligence algorithms, such as neural networks trained for text detection and recognition in images. It should be noted that the visual content of the video file may also be processed beforehand, in order to e.g. enhance the quality of the visual content before performing the text content extraction, e.g. by using image enhancement algorithms.

During step S12, the processing device uses the text content extracted from the visual content of the video file to generate a context information that will be used for the transcription of the audio content of the video file. Basically, the whole text content extracted from the visual content may be used as such as context information.

Figure 2:
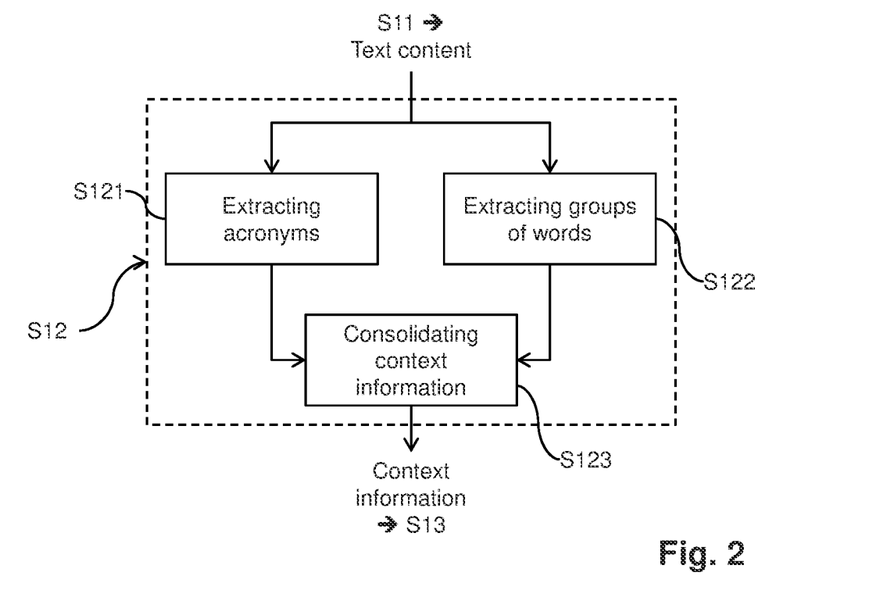
FIG. 2: a diagram representing the main steps of an exemplary embodiment of a context information generation step.

FIG. 2 represents schematically a preferred embodiment of generating step S12, in which the processing device generates the context information by extracting acronyms and/or groups of words from the text content extracted from the visual content. As illustrated in FIG. 2, step S12 of generating the context information comprises in this example:

a step S121 of extracting acronyms from the text content;

a step S122 of extracting groups of words from the text content;

a step S123 of consolidating the context information.

For instance, step S121 of extracting acronyms may be carried out by automatically searching for extracted words which comprise only uppercase letters, or at least several uppercase letters, and which are not present in a common word dictionary.

For instance, step S122 of extracting groups of words may be carried out by automatically searching for extracted groups of words which appear more than once in the text content extracted from the visual content. It is also possible to use POS ("Parts of Speech") tagging algorithms to extract groups of words from the text content extracted from the visual content. For instance, POS tagging is used to extract bigrams and/or trigrams. A bigram is a combination of two words with their sequence retained. Similarly, a trigram is a combination of three words with their sequence retained. Lemmatization algorithms may also be applied on the groups of words (e.g. bigrams and/or trigrams) obtained after POS tagging. Lemmatization usually refers to morphological analysis of words, normally aiming at removing inflectional endings only and to return the base or dictionary form of a word, which is usually referred to as the lemma (for instance "cats" is automatically converted to "cat", etc.). In that case, these lemmatized words can be used to create the final groups of words (e.g. bigrams and/or trigrams), with their sequence retained.

Then, step S123 of consolidating the context information combines the acronyms and groups of words extracted from the text content extracted from the visual content.

It should be noted that, in some embodiments at least, it is also possible to combine the context information automatically obtained from the text content extracted from the visual content with context information that may be manually obtained. For instance, it is possible to collect manually, beforehand, lists of words and groups of words that are used within an enterprise's environment. Such lists may also be included in the context information, together with the acronyms and groups of words automatically extracted from the visual content.

Returning to FIG. 1, the processing method 10 comprises a step S13 of converting the audio content of the video file into text, by using the context information generated based at least on the visual content of the video file. This converting step S13, which corresponds to the transcription of the audio content of the video file, may use any transcription algorithm or engine which accepts context information as input (e.g. Google Speech to text, Azure Speech to text API, etc.).

Figure 3:
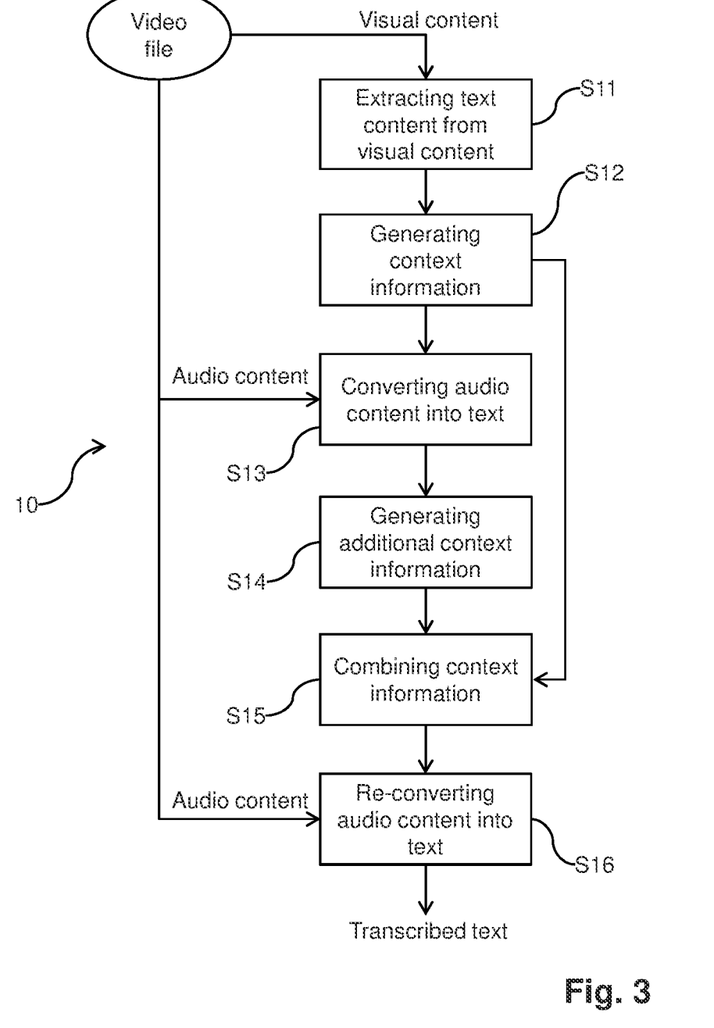
FIG. 3: a diagram representing the main steps of a preferred embodiment of a method for processing a video file.

FIG. 3 represents schematically the main steps of a preferred embodiment of the processing method 10. As illustrated by FIG. 3, the processing method 10 comprises, in addition to the steps represented in FIG. 1:
- a step S14 of generating an additional context information for the audio content based on the text obtained by converting the audio content;
- a step S15 of combining the context information generated based on the text content extracted from the visual content with the additional context information so as to obtain a combined context information;
- a step S16 of re-converting the audio content into text by using the combined context information.

Step S14 of generating an additional context information is similar to step S12 of generating the context information from the text content extracted from the visual content, except that it is applied on the text transcribed from the audio content of the video file. Hence, everything that has been described previously for step S12 applies also for step S14. Afterwards, the context information obtained from the visual content and the context information obtained from the text content are combined (step S15) in order to produce a combined context information. This combined context information is then used to re-transcribe the audio content of the video file, during step S16. Improved accuracy of the text transcribed from the audio content is expected by iterating the transcription and by augmenting the context information.

In practice, the visual content of the video file will comprise a plurality of successive frames (e.g. 25 frames per second of the video file or more), and the number of frames of a visual content of a video file might be very large. Hence, the computational complexity associated with extracting the text content embedded in the visual content might be important.

Figure 4:
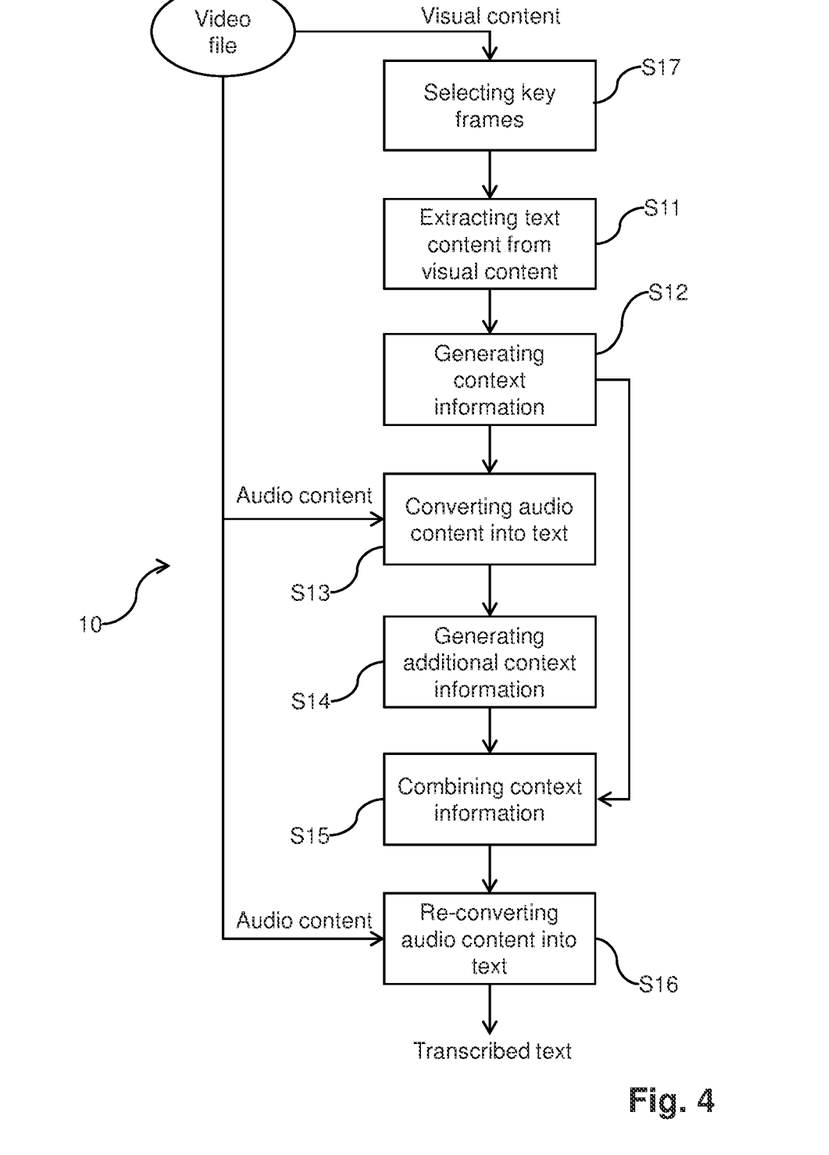
FIG. 4: a diagram representing the main steps of an exemplary embodiment of a post-processing step.

FIG. 4 represents schematically the main steps of a preferred embodiment of the processing method 10. As illustrated by FIG. 4, the processing method 10 comprises, in addition to the steps represented in FIG. 3, a step S17 of selecting key frames among the frames of the visual content. Once the key frames are selected, the step S11 of extracting the text content from the visual content is executed only on the key frames, and the other frames are not processed in order to reduce computational complexity.

For example, when slides are presented during an oral presentation or a webinar, etc., then the speaker usually discusses each slide during a certain amount of time. In that case, the visual content of the video file, when it represents the slides presented, remains still most of the time, and will change only when the speaker switches from one slide to another. In other words, when the visual content comprises successive frames, many frames might be identical or at least almost identical. Not all these identical or almost identical frames should be processed to extract the text content embedded therein, and the selection of the key frames may resume to retain only one frame among successive identical or almost identical frames. Preferably, the key frame corresponds to the first (or last) frame of said successive identical or almost identical frames along the temporal axis, in order to retain the information regarding transitions between frames that are not identical.

For instance, identical frames, or almost identical frames, can be detected by comparing successive frames by e.g. using image correlation techniques or any known method for evaluating image resemblance.

According to a first example, the step S17 of selecting key frames may comprise computing hash codes for the successive frames and comparing the computed hash codes for detecting identical frames. Hence, for each frame, a hash code is generated by using an image hashing function. Two or more frames having the same hash code are considered similar, and all but one of these frames are discarded, e.g. the first of these frames along the temporal axis. In practice, any existing image hashing function may be used. Preferably, a perceptual image hashing function is used, such that a small difference between two frames will nonetheless result in two identical hash codes.

According to a second example, with may considered alone or in combination with the previous examples, the step S17 of selecting key frames may comprise comparing the respective text contents of successive frames. For instance, it may fetch text from two frames and perform cosine comparison of the fetched text of said two frames. If the fetched text is considered similar, one of the frames can be discarded. In order to fetch text from the frames, it is possible to use OCR techniques. However, in order to limit computational complexity, it is possible to use low quality OCR techniques (the text extracted from a frame needs not to be perfect, it needs only to be comparable with the text extracted from another frame) and/or to consider only a portion of the frame (i.e. it is not necessary to extract all the text of the frame).

According to a third example, with may considered alone or in combination with the previous examples, the step S17 of selecting key frames may comprise computing a SSIM ("Structural SIMilarity") index of successive frames. SSIM index computation is usually used in the video industry but has as well a strong application in photography. SSIM indexes measure the perceptual difference between two similar images and provides a comparison value in terms of percentage. For instance, two frames for which a SSIM index above 90% is computed may be considered similar and one of these frames may be discarded.

For instance, when combining several algorithms to select key frames, it is possible to e.g. first apply image hashing to discard a first set of frames, then to apply on the remaining frames text comparison to discard a second set of frames, and finally to apply on the remaining frames SSIM index computation to discard a third set of frames, and the remaining frames are retained as key frames of the visual content.

Preferably, when key frames are selected, it is possible to obtain respective times of said key frames, and to slice the audio content into several audio chunks based on the times of the key frames, in order to e.g. track a sort of time synchronization between the audio content and the key frames. As discussed above, the key frames correspond preferably to the transition frames (i.e. each key frame is for instance the first frame among similar frames along the temporal axis), such that each audio chunk represents in principle the portion of the audio content that is associated with the visual content of the key frame. For instance, this can be used to associate the text transcribed from an audio chunk with the corresponding key frame (e.g. a slide) and/or to divide the whole text transcription into several paragraphs comprising at least one separate paragraph per audio chunk.

In some embodiments, the processing method 10 may comprise, after the converting step S13 (or the re-converting step S16), a step of post-processing S18 the transcribed text. The post-processing step S18 aims at improving the perceived quality of the transcribed text, and may perform at least one among adding punctuation, removing filler spoken expressions, breaking sentences into several sentences, grouping sentences in respective paragraphs, recommending sentences for review, etc.

Figure 5:
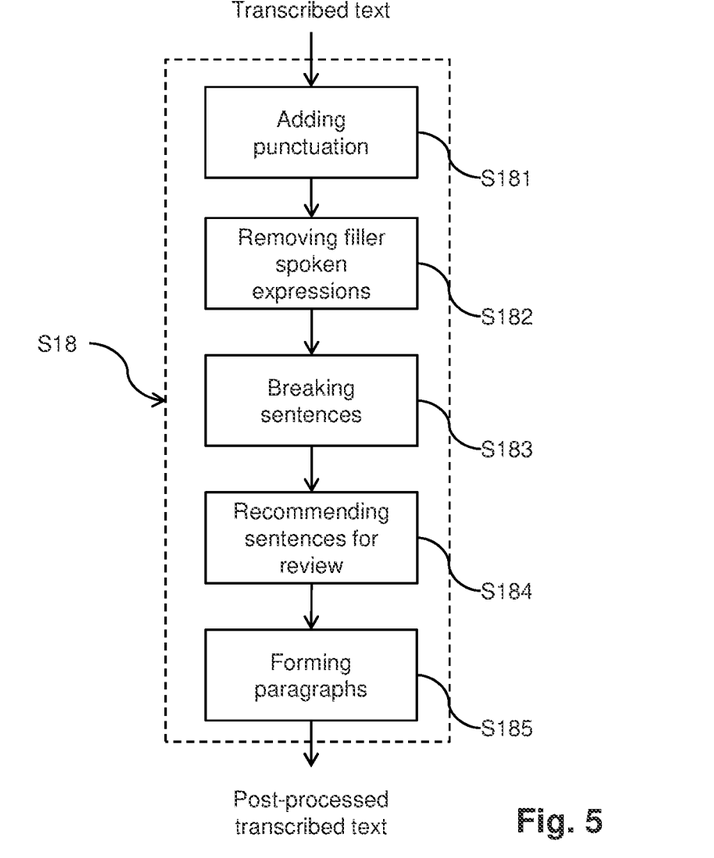
FIG. 5: a diagram representing the main steps of an exemplary embodiment of a post-processing step.

FIG. 5 represents schematically the main steps of an exemplary embodiment of the post-processing step S18. It should be noted that the order of execution of the steps in FIG. 5 is exemplary, such that the steps represented in FIG. 5 may be executed in a different order. Also, the post-processing step S18 may comprise a different number of steps, e.g. said post-processing S18 step does not necessarily comprise all the steps represented in FIG. 5.

As illustrated by FIG. 5, the post-processing step S18 may comprise a step S181 of adding punctuation. Indeed, spoken language does not have explicit punctuation like comma, full stop, question mark, etc. The transcribed text would preferably need to have punctuations to make it readable by a user. For instance, punctuation may be added by applying a deep learning neural model on the transcribed text. Baseline training of such a deep learning model can be done using good quality, comprehensive public text data sources. One of such suitable data sources that can be used for training is e.g. Wikipedia®.

As illustrated by FIG. 5, the post-processing step S18 may comprise a step S182 of removing filler spoken expressions. Indeed, spoken language may sometimes have words or expressions such as "Ah", "Euh", "Hmm", etc., which should not be part of the transcribed text. This step S182 of removing filler spoken expressions may use NLP ("Natural Language Processing") algorithms, which may use a pre-established dictionary containing typical filler spoken expressions that are to be removed. In that case, each filler spoken expression from the dictionary is searched in the transcribed text and removed when found.

As illustrated by FIG. 5, the post-processing step S18 may comprise a step S183 of breaking sentences. Indeed, while speaking, people tend to use very long sentences with conjunctions in between. Most often, these long sentences can be broken into two or more small sentences based on the position of the conjunctions in said long sentence. For instance, POS tagging algorithms may be used to break sentences.

As illustrated by FIG. 5, the post-processing step S18 may comprise a step S184 of recommending sentences for review. Hence, the goal is to ask a user to review one or more sentences to check whether or not these sentences need to be amended and/or deleted. For instance, this step S184 of recommending sentences for review may use one or more pre-established dictionary containing trigger words. In that case, each trigger word from the dictionary(ies) is searched in the transcribed text. When a trigger word is found, the sentence containing this trigger word is recommended for review and presented to the user. Trigger words may include e.g. vulgar words (which should be removed), specific words such as "confidential" which might require a decision as to whether the corresponding sentence or paragraph should be kept in the transcribed text or not, etc.

As illustrated by FIG. 5, the post-processing step S18 may comprise a step S185 of forming paragraphs. Indeed, the transcribed text will usually be made of single paragraph, which might be difficult to read. For instance, the step S185 of forming paragraphs may use the respective times of the key frames to break the single paragraph into several paragraphs. In other words, the transcribed text of each audio chunk should comprise at least one separate paragraph in the whole text transcription of the audio content of the video file. It is also possible to further divide the transcribed text into several paragraphs based on e.g. a maximum number of words per paragraph, etc.

It is emphasized that the present invention is not limited to the above exemplary embodiments. Variants of the above exemplary embodiments are also within the scope of the present invention.

The invention claimed is:

1. A method for processing a video file, said video file comprising audio content and visual content, the visual content comprising text content, wherein the method comprises:

extracting, by a processing circuit comprising a processor and a memory, the text content in the visual content;

generating, by the processing circuit, a context information for the audio content based on the text content extracted from said visual content;

converting, by the processing circuit, the audio content into text by using the context information generated based on the text content extracted from the visual content of the video file;

generating, by the processing circuit, an additional context information for the audio content based on the text obtained by converting the audio content;

combining, by the processing circuit, the context information generated based on the text content extracted from the visual content with the additional context information in order to obtain a combined context information; and re-converting, by the processing circuit, the audio content into text by using the combined context information.

2. The method according to claim 1, wherein:

the visual content comprises successive frames, and the method further comprises selecting, by the processing circuit, key frames among the frames of the visual content, wherein the text content in the visual content is extracted by processing only the key frames.

3. The method according to claim 2, further comprising obtaining respective times of the key frames and slicing the audio content into a plurality of audio chunks based on the times of the key frames, by the processing circuit.

4. The method according to claim 1, wherein the text content is extracted from the visual content by using Optical Character Recognition (OCR).

5. The method according to claim 1, wherein generating context information based on the text content extracted from the visual content comprises extracting, from the text content extracted from the visual content, acronyms, groups of words, or a combination thereof.

6. The method according to claim 1, further comprising post-processing, by the processing circuit, the text obtained by converting the audio content in order to: add punctuation, remove filler spoken expressions, break sentences into several sentences, group sentences in respective paragraphs, recommend sentences for review, or a combination thereof.

7. A computer program product comprising instructions on a non-transitory computer readable medium which, when executed by a processor, configure said processor to carry out a method for processing a video file according to claim 1.

8. A device for processing a video file, said video file comprising audio content and visual content, the visual content comprising text content, wherein the device comprises a processing circuit comprising a processor and a memory, wherein the processing circuit is configured to:
extract the text content in the visual content;
generate a context information for the audio content based on the text content extracted from said visual content;
convert the audio content into text by using the context information generated based on the text content extracted from the visual content of the video file;
generate an additional context information for the audio content based on the text obtained by converting the audio content;
combine the context information generated based on the text content extracted from the visual content with the additional context information in order to obtain a combined context information; and
re-convert the audio content into text by using the combined context information.

9. The device according to claim 8, wherein:
the visual content comprises successive frames, and
the processing circuit is further configured to select key frames among the frames of the visual content, and to process only the key frames to extract the text content in the visual content.

10. The device according to claim 9, wherein the processing circuit is further configured to obtain respective times of the key frames and to slice the audio content into several audio chunks based on the times of the key frames.

11. The device according to claim 8, wherein the processing circuit is further configured to extract the text content from the visual content by using Optical Character Recognition (OCR).

12. The device according to claim 8, wherein the processing circuit is further configured to generate the context information based on the text content extracted from the visual content by extracting, from the text content extracted from the visual content, acronyms, groups of words, or a combination thereof.

13. The device according to claim 8, wherein the processing circuit is further configured to process the text obtained by converting the audio content in order to: add punctuation, remove filler spoken expressions, break sentences into several sentences, group sentences in respective paragraphs, recommend sentences for review, or a combination thereof.

* * * * *